(12) United States Patent
Funk et al.

(10) Patent No.: US 6,360,626 B1
(45) Date of Patent: Mar. 26, 2002

(54) GEAR MECHANISM, ESPECIALLY FOR A DOUBLE SCREW EXTRUDER

(75) Inventors: Frank Funk, Calden; Bernd Schwarze, Bramsche, both of (DE)

(73) Assignee: Thyssen Henschel Industrietechnik GmbH, Kassel (DE)

( * ) Notice: Subject to any disclaimer, the term of this patent is extended or adjusted under 35 U.S.C. 154(b) by 0 days.

(21) Appl. No.: 09/581,098

(22) PCT Filed: Dec. 7, 1998

(86) PCT No.: PCT/EP98/07925

§ 371 Date: Aug. 1, 2000

§ 102(e) Date: Aug. 1, 2000

(87) PCT Pub. No.: WO99/29486

PCT Pub. Date: Jun. 17, 1999

(30) Foreign Application Priority Data

Dec. 8, 1997 (DE) .......................................... 197 54 359

(51) Int. Cl.$^7$ .............................................. F16H 57/00
(52) U.S. Cl. .................... 74/410; 74/665 GD
(58) Field of Search .................. 74/410, 413, 665 GD, 74/337, 665 F; 384/276

(56) References Cited

U.S. PATENT DOCUMENTS 3,766,797 A * 10/1973 Hanslik et al. ................ 74/410
3,969,956 A * 7/1976 Hanslik .................. 74/665 GD
4,586,402 A * 5/1986 Schäfer ........................ 74/801

* cited by examiner

Primary Examiner—David Fenstermacher
(74) Attorney, Agent, or Firm—Max Fogiel

(57) ABSTRACT

A transmission arrangement for twin-screw extruders in which at least one reduction stage that includes a drive shaft, adapts speeds and torques to various applications. The output of the transmission is divided by a bifurcating stage which is connected to two output shafts. At least a part of the output is transmitted to an intermediate shaft located downstream of the bifurcating stage. First opposing gear wheels with herringbone teeth are mounted on the intermediate shaft and engage second gear wheels on the intermediate shaft for relieving axial forces. One of the output shafts is mounted on sliding bearings and is driven directly by the bifurcating stage.

9 Claims, 3 Drawing Sheets

GEAR MECHANISM, ESPECIALLY FOR A DOUBLE SCREW EXTRUDER

Figure 1:
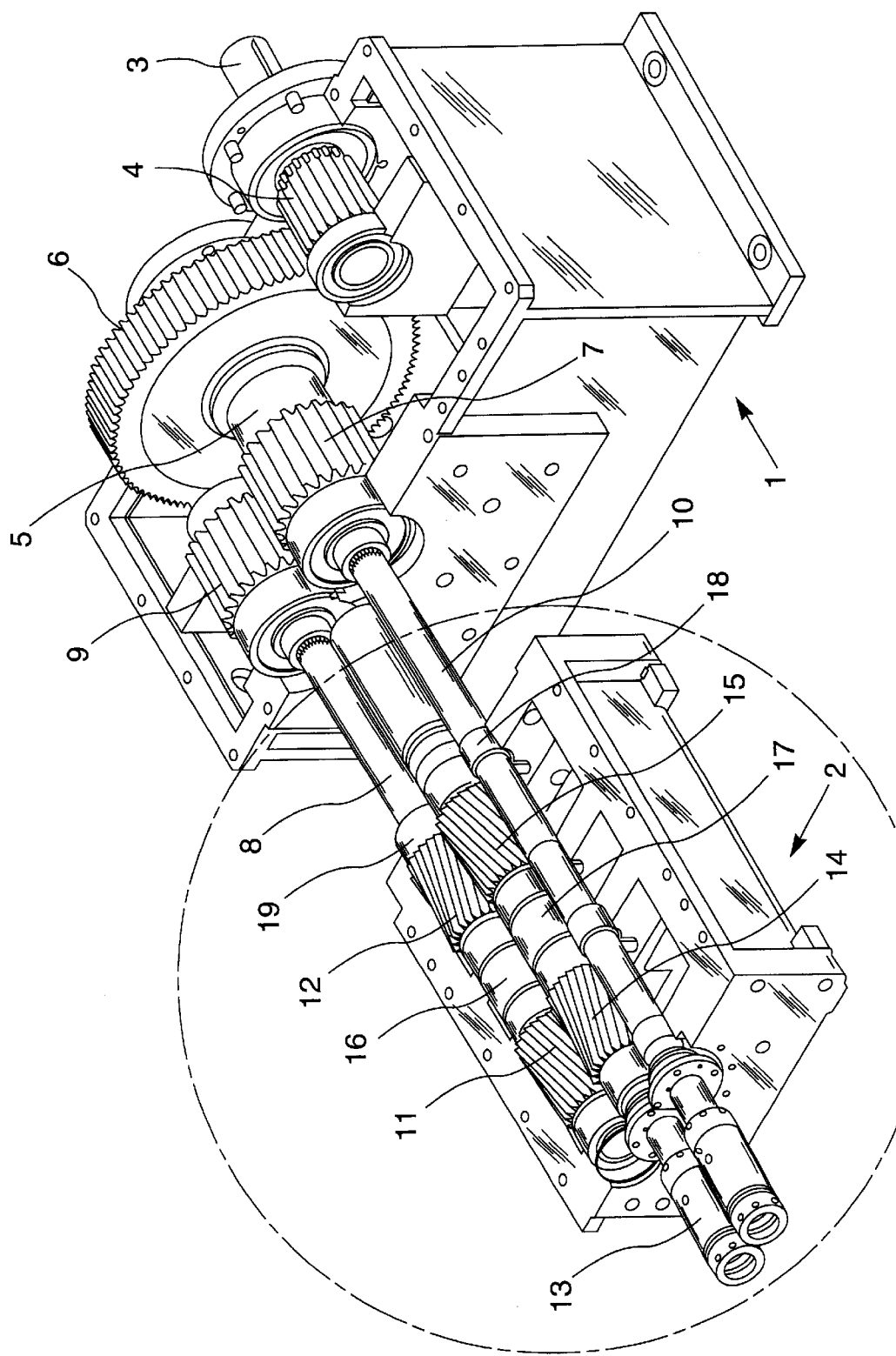

The present invention concerns a transmission, especially for twin-screw extruders, with a driveshaft, at least one reduction stage, an output-bifurcating stage, and two output shafts. The reduction stage or stages adapt the speed and torque to various applications.

A transmission for twin-screw extruders of this genus is known from European Patent A 0 670 495. It includes a driveshaft and at least one output shaft. The output shaft is driven by the driveshaft by way of at least one helical driving gearwheel mounted thereon and by way of at least one helical output gearwheel mounted on the output shaft. The gearwheels engage axially movable and helical intermediate gearwheels. The intermediate gearwheels are associated with an axial-force compensator. This transmission distributes the load adequately between the two intermediate gearwheels but is complicated and takes up considerable space.

The object of the present invention is accordingly a completely advanced transmission of the aforesaid genus that will occupy less space and reliably transmit even powerful torques at a speed appropriate for the particular application.

The advantage of the present invention is that, since the sliding bearings occupy less space, the axes of the individual shafts can be closer together even though an equivalent torque is transmitted. It will, however, also be possible to transmit more powerful torques without varying the distance between the shafts by using longer-diameter shafts or gearwheels or, if the shafts lack sliding bearings, larger radial bearings.

The output shafts in one preferred embodiment of the present invention, rotate in the same sense. This embodiment can be employed to drive a twin-screw extruder with screws that rotate in the same sense.

The two output shafts can be even closer together if at least one intermediate shaft is interposed downstream of the output-bifurcating stage and can accommodate at least some of the transmitted output. Such an arrangement will also allow the rotation to be reversed.

The advantage of closer-together output shafts can also be attained if the intermediate shaft merges directly into one of the output shafts.

It will also be possible for the intermediate shaft and one of the output shafts to engage each other directly by way of gearwheels. This arrangement will allow further transmission of output in the opposite sense.

In one practical embodiment of the present invention, opposingly cogged helical gearwheels are mounted the other on the intermediate shaft and one on the output shaft, creating a herringbone gearwheel that eliminates axial force. The result is a distribution of output followed by addition, the output components being precisely equal. This distribution of output allows more gearwheels and bearing to be employed, decreasing the load on the individual components. Another advantage is that the intermediate shaft and the output shaft can be sectioned and connected by a clutch.

The output in one preferred embodiment of a transmission with output shafts that rotate in the same sense is distributed between an intermediate shaft and a output shaft by way of directly mutually engaging gearwheels, the intermediate shaft meshing with another output shaft by way of other gearwheels.

A hydrodynamic film can be created to make them stronger by lubricating the sliding bearings.

This special film on the bearings'surface will allow reliable operation even in a combined-friction range.

Depressions in the bearings'surface can promote formation of the film. To improve introduction of the lubricant and hence promote heat removal, the depressions can be channels. If the channels extend at an angle to the radial plane, the dragging flow of the lubricant can be exploited to remove even more heat, eliminating the usual need for to supply oil under pressure.

Figure 2:
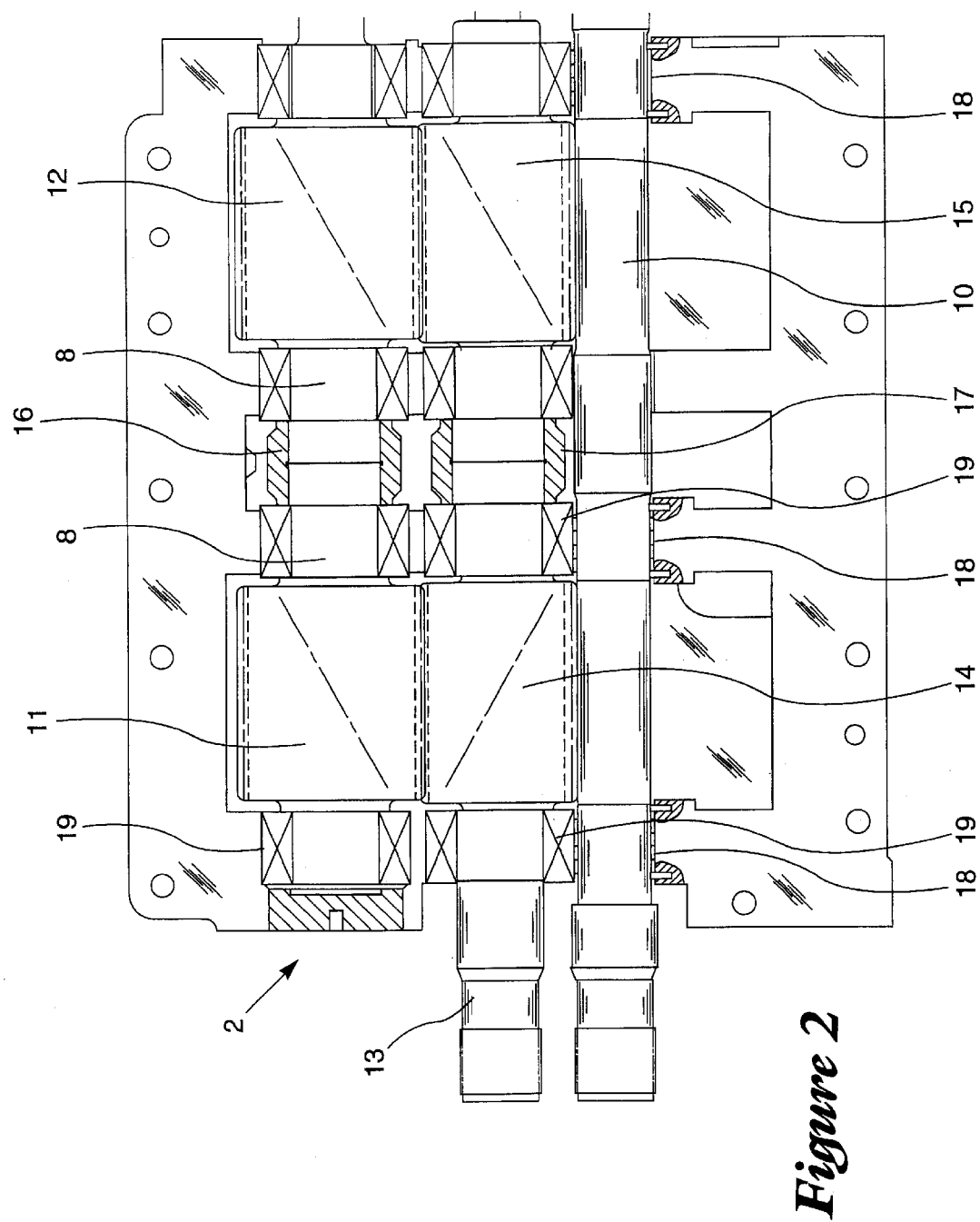
Figure 3:
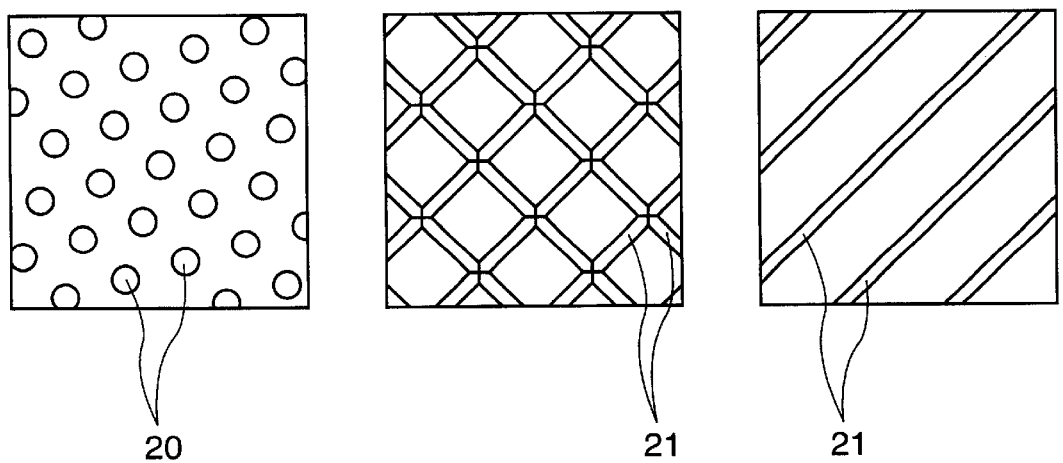

The present invention will now be specified with reference to the attached drawing, wherein FIG. 1 is an opened schematic representation of a transmission in accordance with the present invention, FIG. 2 illustrates in principle how the sliding bearings are installed in the transmission, and FIG. 3 illustrates appropriate structures for the surfaces of sliding bearings employed in a transmission in accordance with the present invention.

The transmission for a twin-screw extruder illustrated in FIG. 1 comprises a main transmission section 1 and an intermediate transmission section 2. Power is supplied to a driveshaft 3 by way of a pinion 4. Pinion 4 meshes with a gearwheel 6 on another shaft 5. An output-distributing pinion 7 on shaft 5 engages an intermediate pinion 9 on an intermediate shaft 8. The output from shaft 5 is bifurcated and distributed between intermediate shaft 8 and a output shaft 10 by way of output-distributing pinion 7 and intermediate pinion 9. Mounted on intermediate shaft 8 in the vicinity of intermediate transmission section 2 are two opposingly cogged gearwheels 11 and 12 that engage two similarly cogged gearwheels 14 and 15 mounted on another output shaft 13. Intermediate shaft 8 and output shaft 13 are composed of sections interrupted between gearwheels 11 and 12 and 14 and 1 gearwheels 14 and 15 and connected by clutches 16 and 17, as will be evident from FIG. 2.

As will also be evident from FIG. 2, output shaft 10 is accommodated in sliding bearings 18 and output shaft 13 in roller bearings 19. Sliding bearings can also be provided for one or more additional shafts within the scope of the present invention. When for example output shafts 10 and 13 are accommodated in sliding bearings, the shafts can be closer together axially and still transmit the same torque.

FIG. 3 illustrates structures appropriate for sliding-bearing surfaces. Disconnected depressions 20 for example can be introduced into such a surface, extensively eliminating any exchange of lubricant between the depressions. The depressions can, however, alternatively constitute channels 21 that transport the lubricant, increasing the removal of heat. To ensure a well defined circulation of lubricant, channels 21 can extend essentially parallel and at an angle to the radial plane.

What is claimed is:

1. A transmission arrangement for twin-screw extruders, comprising: a drive shaft; at least one reduction stage including said drive shaft and adapting speed and torque to various applications; an output-bifurcating stage for dividing an output; two output shafts connected to said output-bifurcating stage for receiving the divided output; at least one intermediate shaft downstream of said output-bifurcating stage, at least a part of said output being transmitted to said intermediate shaft; first opposing gear wheels with herringbone teeth mounted on said intermediate shaft and engaging second gear wheels on said intermediate shaft and having herringbone teeth for relieving axial forces; sliding bearings for mounting one of said output shafts, said output-bifurcating stage driving directly said one of said output shafts.

2. A transmission arrangement as defined in claim 1, wherein said output shafts rotate in the same sense.

3. A transmission arrangement as defined in claim 1, including a clutch, said intermediate shaft and one of said output shafts having sections connected by said clutch.

4. A transmission arrangement as defined in claim 1, including third and fourth gear wheels engaging each other, said output being distributed to said intermediate shaft and said one of said output shafts through said third and fourth gear wheels, said intermediate shaft meshing with the other one of said output shafts.

5. A transmission arrangement as defined in claim 1, wherein said sliding bearings have a hydrodynamic film of lubricant.

6. A transmission arrangement as defined in claim 5, wherein said sliding bearings have a slide-over surface with a coat of lubrication effective in a combined-friction range.

7. A transmission arrangement as defined in claim 5, wherein said slide-over surface has depressions.

8. A transmission arrangement as defined in claim 7, wherein said depressions are channels.

9. A transmission arrangement as defined in claim 8, wherein said channels extend substantially parallel and at an angle to a radial plane.

\* \* \* \* \*